No. 752,208. Patented February 16, 1904.

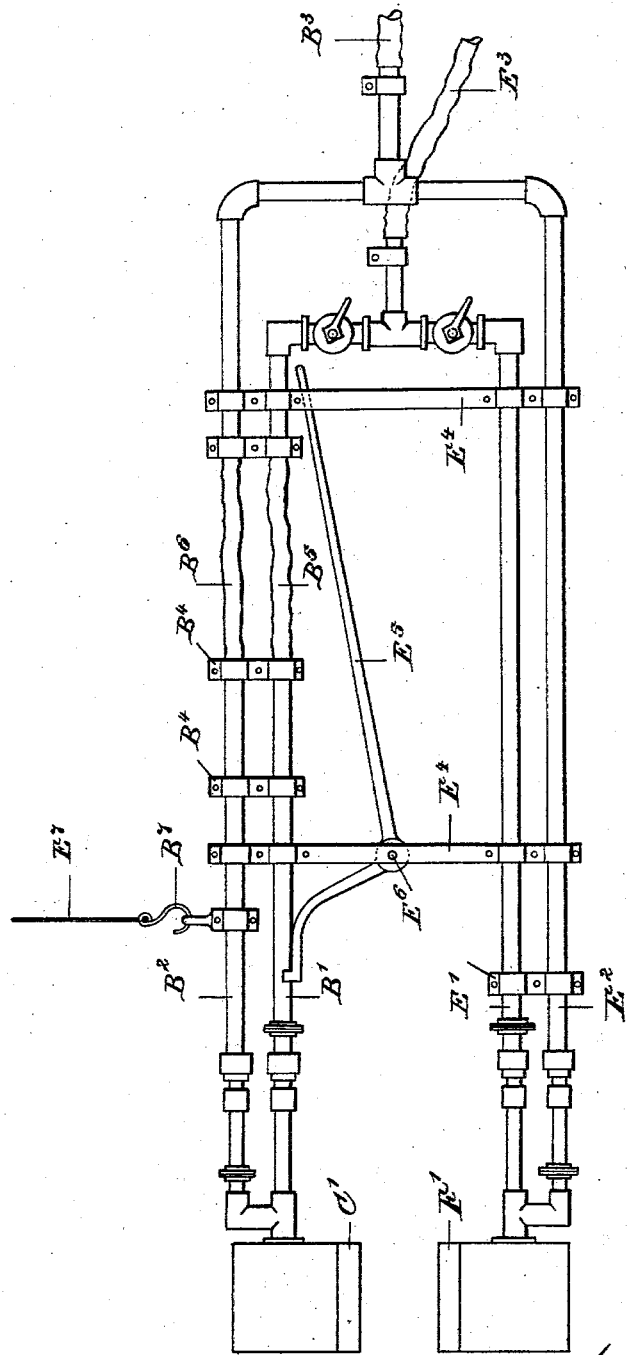

UNITED STATES PATENT OFFICE.

HUGO DICKE, OF FRANKFORT-ON-THE-MAIN, GERMANY, ASSIGNOR TO JACOB EDUARD GOLDSCHMID, OF FRANKFORT-ON-THE-MAIN, GERMANY.

WELDING APPARATUS.

SPECIFICATION forming part of Letters Patent No. 752,208, dated February 16, 1904.

Application filed September 14, 1901. Serial No. 75,372. (No model.)

*To all whom it may concern:*

Be it known that I, HUGO DICKE, head engineer, residing at Neue Mainzerstrasse No. 14, Frankfort-on-the Main, German Empire, have invented new and useful Improvements in Welding Apparatus, of which the following is a specification.

The present invention relates to an apparatus to be applied in heating and welding metal, wherein a flame or several flames of water-gas is or are used for the purpose of locally heating a certain portion of the material with a view of welding parts of that portion.

The new apparatus is adapted to be used in such cases where it is desirable to work on a piece to be welded at two different places.

Especially the apparatus may be applied together with a fixed burner—as, for instance, such as described in my prior application, Serial No. 55,489, of April 12, 1901, and in my application filed with the present one.

In the accompanying drawing the apparatus is represented.

The figure shows a pair of burners which are carried by a movable support in such a way that they may be employed at different points of a workshop.

$C'$ and $F'$ are two water-gas burners carried, respectively, by the feeding-tubes $B'$ and $E'$ for the gas and $B^2$ and $E^2$ for the air. These tubes are formed in a loop or fork, at the apex of which rubber tubes $B^3$ and $E^3$ are connected, which lead to the air and gas reservoirs, respectively. The tubes $B'$ and $B^2$ $E'$ and $E^2$ are connected by braces $B^4$ and $E^4$ to form a self-supporting structure. The parts $B^5$ $B^6$ of the tubes $B'$ $B^2$ may be elastic, and for that purpose rubber tubes may be employed. In this case a lever $E^5$, pivoted at $E^6$, is used to lift the front parts of the tubes $B'$ $B^2$, which are weighted by the burner $C'$. This burner is released after having been brought to its place of work. The entire structure is suspended by the hook $B^7$ to rope $E^7$ and may be carried thereby to any desirable place.

Now what I claim, and desire to secure by Letters Patent, is the following:

1. In an apparatus for locally heating metals for welding purposes, the combination of an upper burner, a lower burner, air and gas pipes forming a portable forked structure or yoke connected to and supporting each of said burners, means for adjusting the burners with respect to each other, and means for freely suspending said yoke.

2. In an apparatus for locally heating metals for welding purposes, the combination of an upper burner, a lower burner, air and gas pipes connected to and supporting each of said burners, said pipes being united at their rear ends to form a forked structure, and a flexible connection in one side of said forked structure, whereby the burners are adjustable with respect to each other.

3. In an apparatus for locally heating metals for welding purposes, the combination of an upper burner, a lower burner, air and gas pipes connected to each burner, said pipes being united at their rear ends to form a forked structure, cross-braces connecting the pipes of each burner, and a flexible connection in one side of said forked structure, whereby the burners are adjustable with respect to each other.

4. In an apparatus for locally heating metal for welding purposes, the combination of an upper burner, a lower burner, air and gas pipes connected to each burner, said pipes being united at their rear ends to form a forked structure, cross-braces connecting the pipes of each burner, a flexible connection in one side of said forked structure, means for suspending said apparatus from an overhead support, and means for adjusting the flexible burner toward and from the other burner.

In testimony whereof I have signed my name to this specification in the presence of two subscribing witnesses.

HUGO DICKE.

Witnesses:
HERMANN WEIL,
EVA SATTLER.